(12) United States Patent
Kurzrok

(10) Patent No.: US 6,260,064 B1
(45) Date of Patent: Jul. 10, 2001

(54) WEB SITE WITH AUTOMATIC RATING SYSTEM

(76) Inventor: Paul J. Kurzrok, 64-33 99 St., 4A, Forest Hills, NY (US) 11374

( * ) Notice: Subject to any disclaimer, the term of this patent is extended or adjusted under 35 U.S.C. 154(b) by 0 days.

(21) Appl. No.: 09/227,418

(22) Filed: Jan. 8, 1999

(51) Int. Cl.[7] .................................................... G06F 13/00
(52) U.S. Cl. ........................... 709/224; 709/219; 709/313
(58) Field of Search ..................................... 709/217, 219, 709/223, 224, 204, 205, 206, 313, 328, 329

(56) References Cited

U.S. PATENT DOCUMENTS

| | | | |
|---|---|---|---|
| 5,872,850 | * | 2/1999 | Klein et al. .............................. 380/49 |
| 5,913,040 | * | 6/1999 | Rakavy et al. ......................... 370/229 |
| 6,064,980 | * | 5/2000 | Jacobi et al. ............................ 705/26 |
| 6,081,788 | * | 6/2000 | Appleman et al. ..................... 705/14 |

* cited by examiner

Primary Examiner—Viet D. Vu
(74) Attorney, Agent, or Firm—Steinberg & Raskin, P.C.

(57) ABSTRACT

In an Internet or similar distributed computer network-based information distribution system, a site host includes a totaling element for totaling ratings for articles and advertisements associated with a particular web page. The ratings are generated by each reader after the reader has read the article or advertisement. The ratings are totaled and used to generate a cumulative rating parameter representative of the popularity of the article. Additionally a predetermined relationship is used to derive from said rating parameters to generate a payment amount to be paid to the author of the article.

14 Claims, 7 Drawing Sheets

SURVEY RESULTS
*TUE 12/22/98 09:20 EST*
ARTICLES

| TEST ARTICLE 1 | | | | |
|---|---|---|---|---|
| EXCELLENT | GOOD | FAIR | NO VALUE | PROFILE |
| 41 VOTES 25% | 41 VOTES 25% | 41 VOTES 25% | 41 VOTES 25% | OVERALL RATING: GOOD TOTAL VOTERS: 164 |

| HOME PAGE ARTICLE | | | | |
|---|---|---|---|---|
| EXCELLENT | GOOD | FAIR | NO VALUE | PROFILE |
| 0 VOTES 0% | 1 VOTES 100% | 0 VOTES 0% | 0 VOTES 0% | OVERALL RATING: GOOD TOTAL VOTERS: 1 |

| POPUP - TEST COMMENT | | | | |
|---|---|---|---|---|
| EXCELLENT | GOOD | FAIR | NO VALUE | PROFILE |
| 0 VOTES 0% | 1 VOTES 100% | 0 VOTES 0% | 0 VOTES 0% | OVERALL RATING: GOOD TOTAL VOTERS: 1 |

*FIG. 4A*

ADVERTISEMENTS

| YOURS IN TRAVEL AD ||||||
|---|---|---|---|---|---|
| EXCELLENT | GOOD | FAIR | NO VALUE | PROFILE ||
| 2 VOTES 40% | 0 VOTES 0% | 2 VOTES 40% | 1 VOTES 20% | OVERALL RATING: FAIR<br>TOTAL VOTERS: 5<br>    CONSUMERS: 3 (60 %)<br>    INDUSTRY PROFESSIONALS: 2 (40 %) ||

| ADVERTISE HERE AD ||||||
|---|---|---|---|---|---|
| EXCELLENT | GOOD | FAIR | NO VALUE | PROFILE ||
| 3 VOTES 75% | 1 VOTES 25% | 0 VOTES 0% | 0 VOTES 0% | OVERALL RATING: EXCELLENT<br>TOTAL VOTERS: 4<br>    CONSUMERS: 3 (75 %)<br>    INDUSTRY PROFESSIONALS: 1 (25 %) ||

*FIG. 4B*

| TEST AD 1 | | | | |
|---|---|---|---|---|
| EXCELLENT | GOOD | FAIR | NO VALUE | PROFILE |
| 102 VOTES<br><br>50% | 0 VOTES<br><br>0% | 0 VOTES<br><br>0% | 101 VOTES<br><br>50% | OVERALL RATING: FAIR<br>TOTAL VOTERS: 203<br>CONSUMERS: 102 (50 %)<br>INDUSTRY PROFESSIONALS: 101 (50 %) |

[ BACK TO INDEX ]

TOTAL ARTICLES FOUND: 3
TOTAL ADVERTISEMENTS FOUND: 3
TOTAL ENTRIES FOUND: 6 ON TUE 12/22/98 09:20 EST

TO REMOVE DATA, ENTER PASSWORD BELOW...

[             ]  [ EDIT ]

<u>EXIT</u>
ANOTHER <u>3.16</u> DESIGN!!

*FIG. 4C*

WEB SITE WITH AUTOMATIC RATING SYSTEM

BACKGROUND OF THE INVENTION

A. Field of Invention

This invention pertains to a web site host and method of operating the same which provides an automatic rating system for some of its contents. The rating system is used to generate a rating indicium which is sent to the content provider and/or to generate a payment therefor.

B. Description of the Prior Art

Web sites on the Internet are fast becoming the preferred way of providing information to readers. While in the past, a person looking for information had to subscribe to and read numerous magazines and other printed media to obtain certain information, much of the same information is available now on web sites. More particularly, articles covering virtually every facet of the business world as well as information related to relaxation, personal hobbies, vacations and similar subjects related to our private world are being written and published electronically so that they are readily available to any one in the world with a telephone and a PC or a TV set. A major problem that plagues the publishers of such information is how to get paid for the contents being provided. The problem has been solved by providing simultaneously with the information commercial advertisement, using banners or other advertising devices. However another problems that still remains is that it is difficult if not impossible under present conditions to determine whether or not the articles and/or advertisements being provided are satisfactory to the readers. Therefore there is a need in the field of electronic publishing for web page hosting and technique which can collect data from the readers indicative of the perceived quality of its contents.

OBJECTIVES AND SUMMARY OF THE INVENTION

In view of the above, it is the objective of the present invention to provide a system for presenting a web site which automatically collects specific qualitative information regarding the contents of the web site, including information concerning associated advertisement.

A further objective is to provide a host and which generates automatically a data base accumulating and compiling said information in an easily readable and informative format.

Other objectives and advantages of the invention shall become apparent from the following description. An electronic publishing system constructed in accordance with the present invention is used to display data over a computer based distributed network, said data including at least one article and/or advertisement. The system includes a receiving element receiving ratings from a reader evaluating said article and advertisement to generate said ratings, a data storage element receiving and storing information related to a site including at least one article and a plurality of advertisements, said information including said ratings, and a totaling element arranged to total ratings from a plurality of readers to generate rating indicia. The indicia may include, for example, including a combined article rating parameter for said article and/or a combined advertisement rating for said advertisement based on ratings from a plurality of readers. The indicia may further include data indicative of the number of readers who have provided said ratings and the percentage of readers who have rated the articles or advertisements as being, for instance excellent, good, fair or no value. The system described above is used to generate cumulative rating parameters on a host site of a distributed network based multiple computer information distribution system, said hosting an informational page including a plurality of articles and advertisements, by presenting said articles and advertisements to a plurality of readers, receiving from said readers a rating associated with at least one of said articles and advertisements, accumulating the responses from said readers said ratings, generating a cumulative rating parameter for articles and/or advertisements for which responses have been received; and providing said rating parameters to a requester together with associated statistical information.

BRIEF DESCRIPTION OF THE DRAWINGS

FIGS. 4A–C shows a typical table or data base for organizing the ratings for the articles and advertisements associated with the host site.

DETAILED DESCRIPTION OF THE INVENTION

Figure 1:
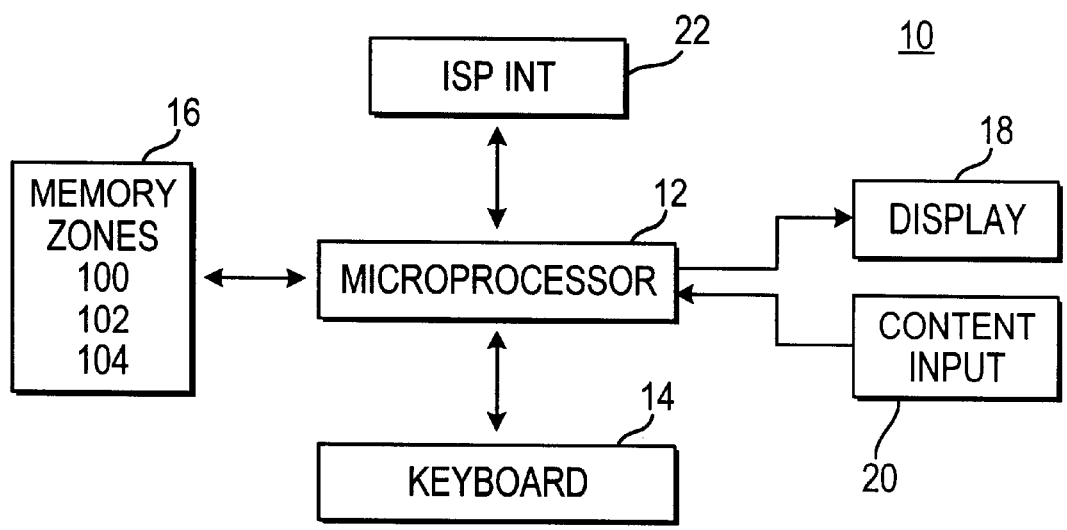
FIG. 1 shows a block diagram of a web hosting site in accordance with this invention.

FIG. 1 shows a system 10 constructed in accordance with this invention which is essentially a web site server consisting of a microprocessor 12, a keyboard 14, a memory 16, a display 18 and a content input device 20. The memory 16 is used to save the data required to define a specific site. Each site is typically formed of a plurality of web pages and is defined using HTML or similar format. New content may be added through the content input device 20 which may be a floppy driver, or other similar data transfer device. The site is published through an ISP interface 22 in the usual manner.

Figure 2:
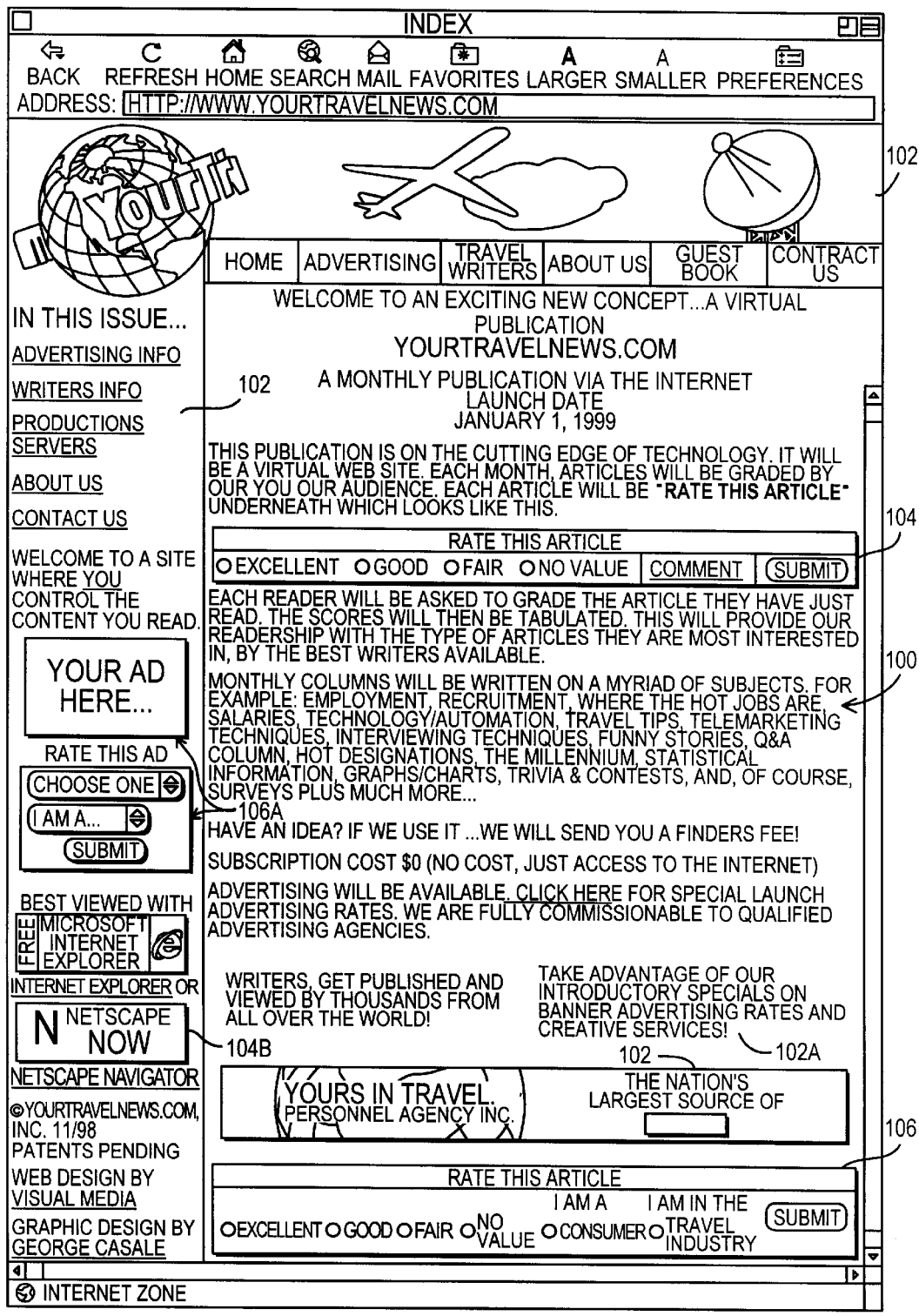
FIGS. 2 show a typical web page with rating zones in accordance with this invention.

Memory 16 includes several files, each file defining a web page of the subject site. For example, FIG. 2 shows how a typical page may look to a reader accessing the site. This particular page may describe to the reader how to install a particular piece of hardware on a PC. The page has two distinct zones. The main zone or portion of the page is the text 100 which provides actual content or information required by a reader. This text may include instructions on a computer-related issue, but of course it may include any kind of information, such as, but not restricted to:

Travelogues

Recipes;

Reviews of a book, play, magazine, musical selection or other literary criticism, Actual literature text.

Also provided in zone 100 may be other types of information besides text, such as graphics, audio and visual information, etc. a second zone 102 is also provided which consists of advertisements. In fact, zone 102 may include a number of such advertisements, which can be spread around or even be embedded in zone 100, as at 102A. In other words the two zones 100, 102 need not be completely separated but may overlap in any fashion desired. Moreover, some of the advertisements such as advertisement 104B may include a link to a different web page. For example, if the content of zone 100 is a travel-related article describing an exotic location, the advertisements may be for an airline providing service to said location. This type of advertisement, as discussed above, may include a hot link so that 'clicking' on the advertisement may connect the reader to a web site providing information about fares, flight schedules and/or any other information, which may or may not be related to the location described in the main article of zone 100.

In accordance with this invention, a third type of zone 104, 106 is provided which is associated either with the main text of zone 100 or one of the advertisements of zone 102. These zones are used to invite the reader to provide rating information about the contents of the associated zone. For instance, in the zone 104 associated with zone 100, the reader is invited to rate the article as being one of "excellent (E)", "good (G)", "fair (F)" or "no value (NV)." Importantly, another field provided in zone 104 is a "comment" field. The reader may select this field, and then write messages describing his opinion.

Similarly, rating zone 106 associated with advertisement zone 102 is provided to obtain similar information about the respective advertisement. The reader may also be invited to indicate classification (i.e., consumer or travel professional) in the field, as at 106A.

Once the reader provides a rating, this rating is compiled with previous ratings by other readers in a data base stored in memory 16.

Figure 3:
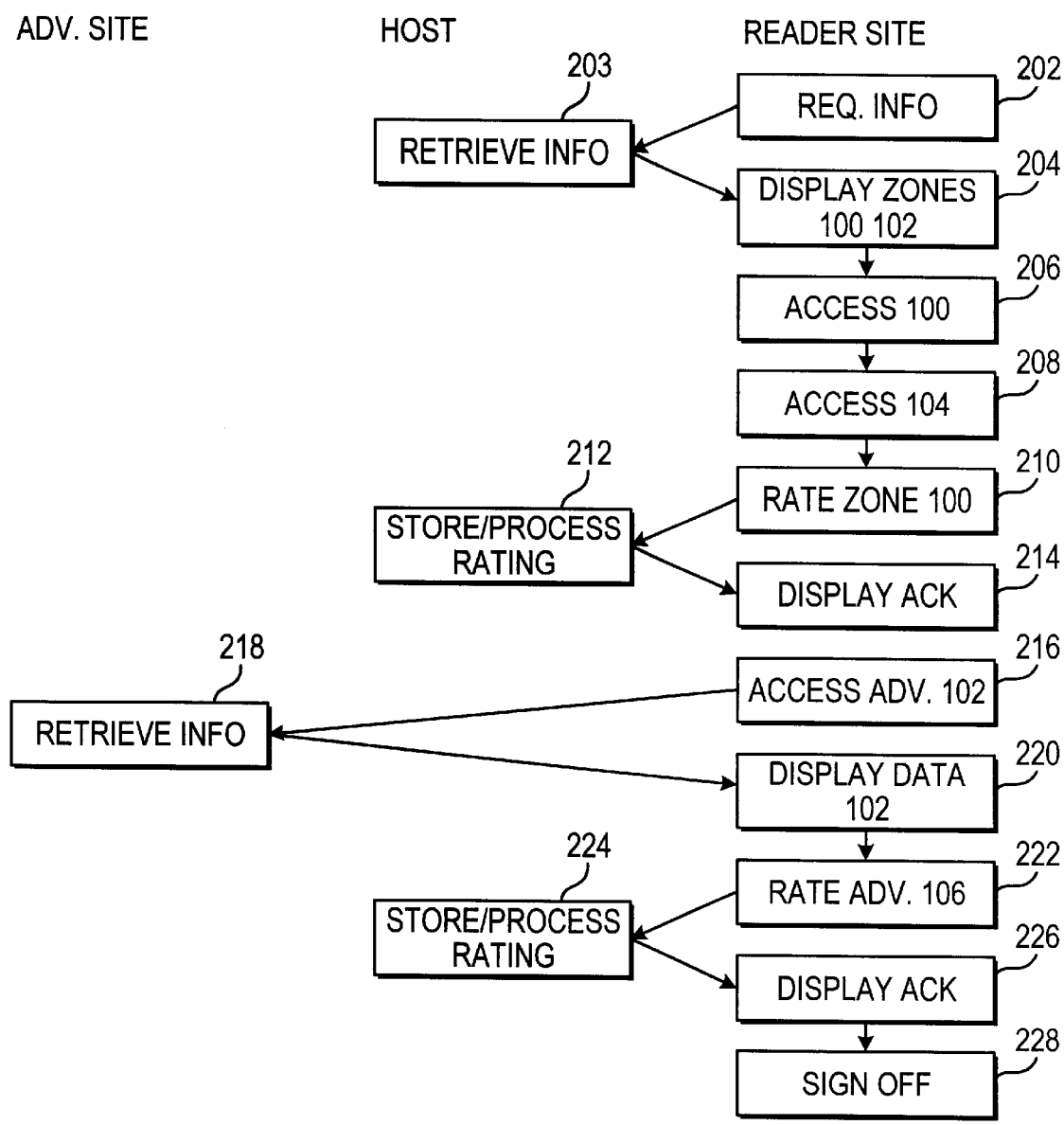
FIG. 3 shows a flow chart for the operation of a system in accordance with this invention.

FIG. 3 shows details of operation of the system. The system consists of several sites remote from each, interconnected by a computer network system such as the Internet. Three of the sites of the system includes a reader site, a host site and an advertisement site.

Starting in step 202, a reader requests access information related to a subject of interest using ISP 22. At the host site, the request is received and, in response, information is retrieved from memory 16 (step 203) which is descriptive of the pages of the subject site including zones 100, 102, 104, 106. This information is returned to the reader site where in responses the zones 100, 102, 104, 106 are displayed in standard manner (Step 204).

In step 206, the reader reads the information or otherwise accesses it. In step 208 the reader accesses zone 104 and in step 210 he rates the article by selecting one of the appropriate bullets of zone 104. He may also add comments by selecting the "comment" field as discussed above. Once the reader has indicated his rating, he can select the 'submit' button and the rating is transmitted to the site host. At the site host, in step 212 the result of the rating is stored and an acknowledgment screen or message is returned to the reader. This acknowledgment screen or message is displayed in step 214.

In step 216, the reader accesses one of the advertisement zones 102 and reads the same. If the zone 102 includes a hot key which is activated by the reader, then in step 216, a message is sent to the advertising site requesting further information. In step 218 the requested additional information is retrieved and transmitted to the reader site. In step 220 the additional information is displayed.

In step 222 the reader accesses the associated rating site 106 and rates the advertisement in a manner similar to the article of zone 100. The rating is sent to the host site where it is stored in step 224. The host site then returns an acknowledgment. In step 226 the acknowledgment is displayed, and in step 228 the reader signs off from the site.

As previously mentioned, after a rating is received, when a request for a rating summary is received or at regular intervals, cumulative rating parameters are calculated for each article and advertisement. For example, the ratings received may be accumulated as follows. A data base is set up for each article and each advertisement. The data base is accumulated as described in the flow chart of FIG. 5. In step 300 of the flow chart a rating is received, as described in detail in the flow chart of FIG. 3. This rating may indicate for example that a current reader found an article (for instance, the 'test Article 1') to be excellent. Therefore in step 302 the result of this latest rating is accumulated with previous result, in this case by incrementing the count in the cell under the Excellent column in the row for the first article. As part of step 302, the total number of ratings for this article is summed.

Similar data bases are also generated for each of the advertisements. The purpose of these data bases, just like for the articles, is to record and summarize the responses from consumers and industry professionals.

In addition, for each rating, a percentage figure is shown indicating how many readers have voted for an article or advertisement as being excellent, etc.

Figure 5:
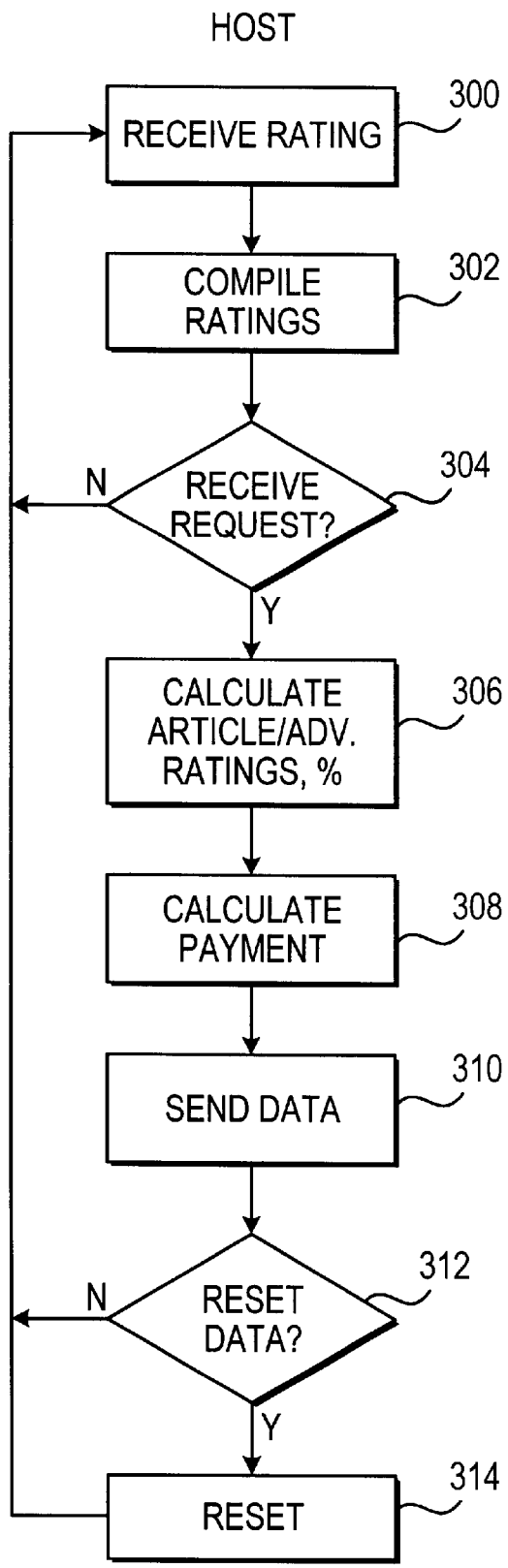
FIG. 5 shows a flow chart for processing and delivery of the rating information.

Getting back to FIG. 5, in step 304 a check is performed to determine if a request has been received for a rating summary. When such a request has been received, then in step 306 an overall rating for each of the various articles is calculated if not performed before.

For example, in FIG. 4A, the test Article 1 received an overall rating of GOOD from a total of 164 voters. In FIG. 4B, the advertisement 'YOURS in Travel' received an overall rating "Fair" from a total of 5 voters, 3 of whom (or 60%) were consumers, and 2 (or 40%) were Industry Professionals.

The overall rating for each article or ad is calculated as follows.

The value of "OR" (overall rating) is obtained by calculating the number of entries in each rating sub-category (excellent, fair, good, or no value) for each article or ad. The percentage of the total is then calculated, then each percentage is run through a set of rules that determine the rating.

The rules basically check for any sub-category with the largest percentage. If one is found, that sub-category value is assigned to "OR."

If not found, "equal" status is checked between any two neighboring sub-categories. The value of the higher of the two categories is assigned to "OR."

If not found, either "good" or "fair" is assigned to "OR", depending on which specific sub categories are found to be "equal."

In step 308 a payment amount is generated for each article. This payment amount may be equal to a preselected base fee multiplied by a special rating parameter R of the corresponding article.

For example if the ratings in the respective columns for the subject article are E, G, F, NV then R may be expressed as:

$$R = W1*E + W2*G + W3*F + W4*NV$$

where W1, W2, W3 and W4 are preselected weighing factors. Typical values for these parameters may be 1.5, 1, 0, and 0.

In step 310 the data bases are sent to the requester, or alternatively, only the total columns and the rating parameters are sent. FIGS. 4A–4C illustrate data collected and tabulated by rating, as well as the background (i.e., consumer/industry pro) of the various readers.

In step 312 a check is performed to determine if the data bases are to be reset or edited. If not, normal processing continues. Otherwise in step 314, a password is requested, (see bottom of FIG. 4C) and if a correct password is entered, the data and/or the format of the data bases can be edited.

Although the communication between the requester for the rating data and the host site may be performed in any secure manner, preferably a secure, password enabled Internet access means may be used, in which case, the data bases can be presented in the form of web pages.

Moreover, the various page components discussed may be presented to the reader in various forms. For example, instead of being presented co-extensively with zones 100, 102, rating zones 104, 106 may be presented pop-up menus.

Numerous modifications may be made to this invention without departing from its scope as defined in the appended claims.

I claim:

1. A web site rating system comprising:
   a host site and a reader site connected to one another via a computer based distributed network, said host site comprising:
   a transmitting element for electronically transmitting at least one article from said host site to said reader site;
   a receiving element for receiving rating information from said reader site at which a reader has evaluated and rated said article;
   a data storage element for storing said rating information;
   a processing element for processing said rating information in response to a request for a rating summary and generating an overall rating of each article based on the rating information received from those of the plurality of readers who have read an article and have provided rating information thereon; and
   a payment generator for generating an amount to be paid for the article, the amount being based on a preselected base fee multiplied by a special rating parameter.

2. The system of claim 1 wherein each reader designates one of a plurality of rating levels for said article, and wherein said processing element generates said combined ratings using a preselected relationship for said rating levels.

3. The system of claim 1, wherein said rating information comprises a rating chosen by the reader from a plurality of rating categories, and
   wherein said overall rating of each article is calculated by calculating the total number of readers who submitted ratings for each article, calculating the number of readers who submitted ratings in each rating category for each article, calculating the percentage of readers who submitted a rating for each rating category for each article, and choosing the rating category for which the greatest percentage of readers submitted ratings.

4. The system of claim 1, wherein said rating information comprises a rating chosen by the reader from a plurality of rating categories (E, G, F, NV), and
   wherein said special rating parameter (R) is calculated using the following algorithm:

$$R = W1*E + W2*G + W3*F + W4*NV,$$

where W1, W2, W3 and W4 are preselected weighing factors.

5. A method of generating an amount to be paid for an article stored on a host site of a distributed network based multiple computer information distribution system, said method comprising:
   transmitting said article to a plurality of readers at a reader site;
   receiving from said readers ratings associated with said article;
   storing said ratings in a data storage element;
   processing said ratings in response to a request for a rating summary;
   generating an overall rating for said article for which ratings have been received;
   transmitting said overall rating to a requester together with the number of readers that provided ratings; and
   generating the amount to be paid for the article, the amount being based on a preselected base fee multiplied by a special rating parameter.

6. A method of generating an amount to be paid for an article stored on a host site of a distributed network based multiple computer information distribution system, said method comprising:
   transmitting the article from the host site to a reader site;
   receiving rating information from the reader site at which a reader has evaluated and rated the article;
   storing the rating information; and
   generating an amount to be paid for the article, the amount being based on the rating information.

7. The method of claim 5 further comprising generating a spread sheet descriptive of the article on a page of said host site, together with corresponding rating parameters, receiving rating information requests and transmitting in response to said requests said spread sheet.

8. The method of claim 5 further comprising displaying a rating menu associated with said article.

9. The method of claim 5 further comprising displaying a rating menu associated with said article, said rating menu indicating a plurality of rating levels; and selecting one of said levels by said reader to generate said rating.

10. The method of claim 9 comprising providing said menu with a reader skill level selection choice, wherein said rating generated by reader includes a reader skill parameter related to said reader skill.

11. The method of claim 10 further comprising generating a spread sheet indicative of ratings selected by readers for various articles.

12. The method of claim 11 further comprising several spread sheets, each spread sheet being associated with a reader skill level.

13. A method of generating an overall rating of an advertisement on a host site of a distributed network based multiple computer information distribution system, said method comprising:
   transmitting said advertisement to a plurality of readers at a reader site;
   receiving from said readers ratings associated with said advertisement together with the reader's classification in a particular field;
   storing said ratings in a data storage element;
   processing said ratings in response to a request for a rating summary;
   generating an overall rating for said advertisement for which ratings have been received;
   transmitting said overall rating to a requester; and
   the requester using said overall rating to determine the effectiveness of said advertisement.

14. The method of claim 13, wherein said receiving step comprises receiving from said readers ratings associated with said advertisement together with information regarding whether the reader is a consumer or a tradesperson.

* * * * *